Nov. 17, 1964
L. HARPER
3,157,079
PIPE CUT-OFF MACHINE
Filed Nov. 24, 1961
3 Sheets-Sheet 1
FIG_1
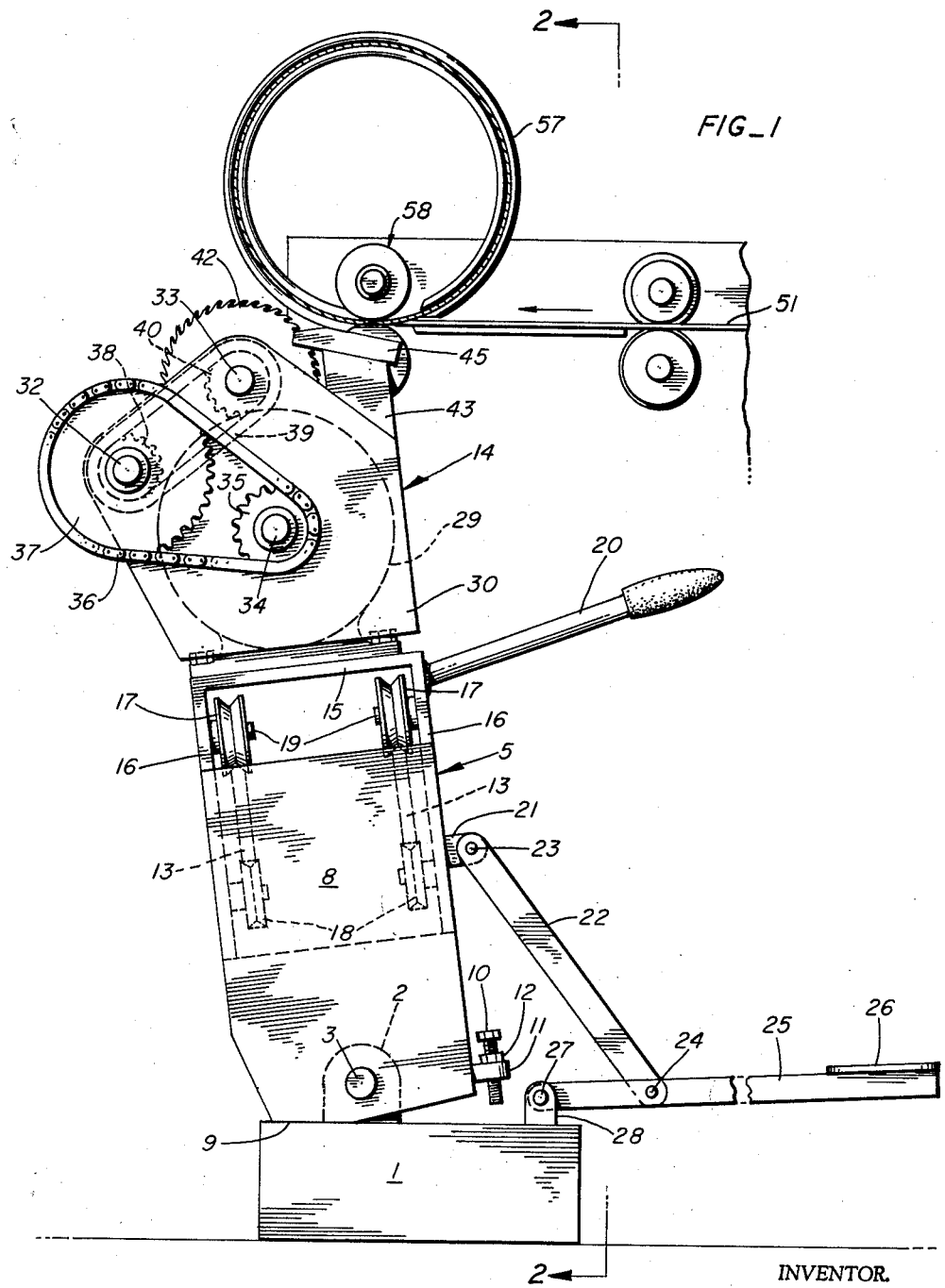
INVENTOR.
*LAFFIE HARPER*
BY
Boykin, Mohler + Wood
ATTORNEYS

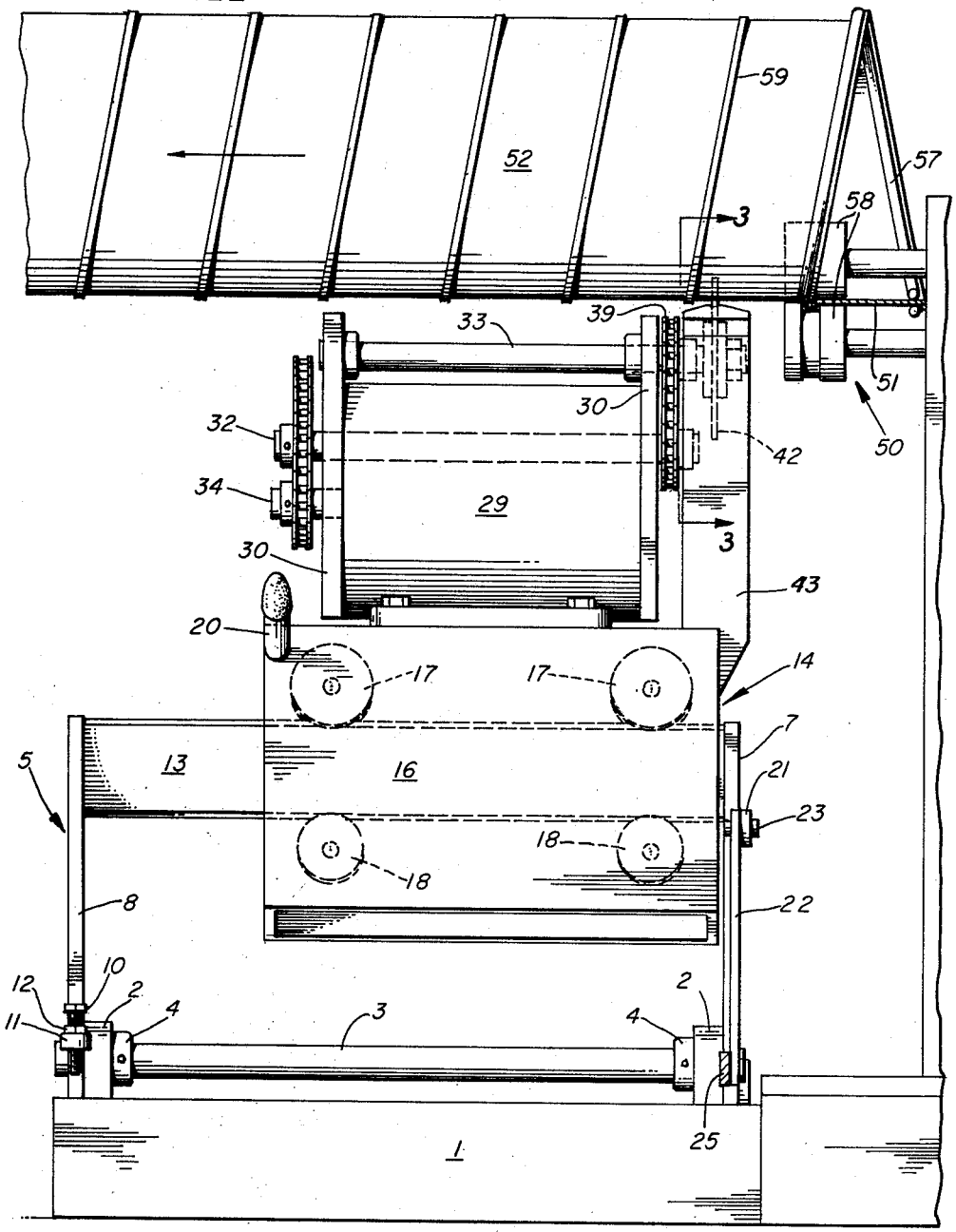

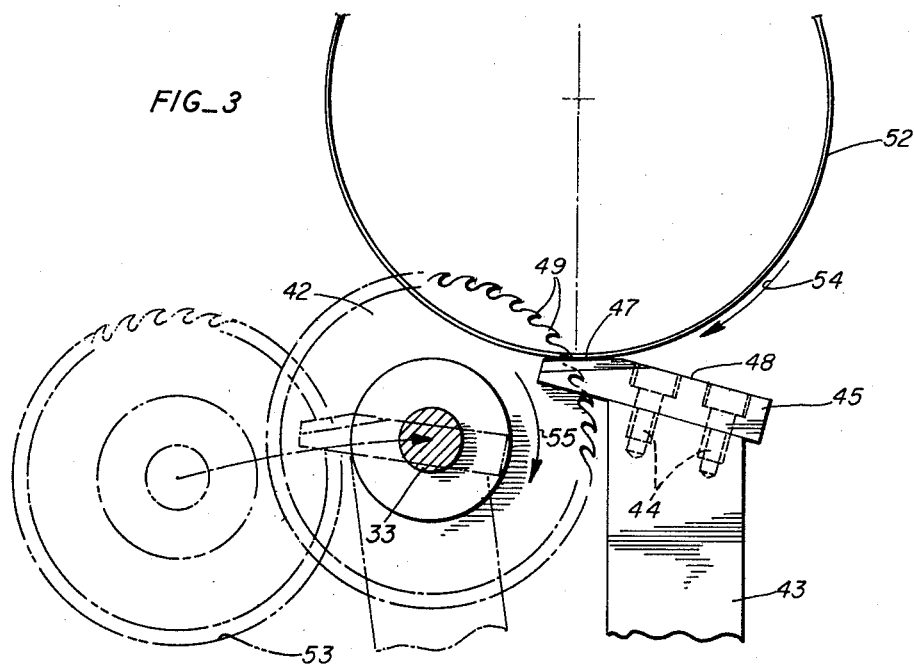
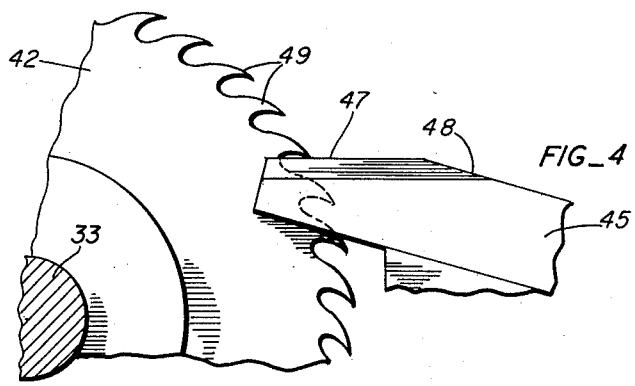
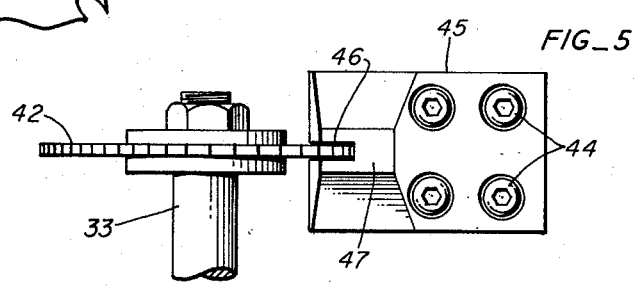

United States Patent Office 3,157,079
Patented Nov. 17, 1964

3,157,079
PIPE CUT-OFF MACHINE
Laffie Harper, 1192 Montgomery Ave., San Bruno, Calif.
Filed Nov. 24, 1961, Ser. No. 154,594
8 Claims. (Cl. 82—47)

This invention relates to a machine for cutting off a length or lengths of sheet metal pipe transversely thereof, and has for one of its objects the provision of a simple, compact, economically made machine that is adapted to cut off pipe lengths in a manner that will leave smooth edges along the line of the cut to substantially eliminate the necessity for subsequent dressing of the ends of the pipe due to burrs or a ragged edge.

Heretofore, in pipe making plants, and in the field where pipe is laid, where necessary to cut into desired lengths, it has been customary to use conventional saws that leave a ragged burr around the entire cut, and thereafter an operator must spend an appreciable length of time in dressing off the burrs and irregularities before the pipe is laid.

In helical lock seam pipe, the pipe coming from the pipe forming machine is continuous, and must be cut into suitable and desired lengths, and as such pipe is formed from a sheet metal strip, the thick seam, which is usually at least four thicknesses of the metal strip, must be cut, as well as the single layer thickness.

The present invention is adapted to cut off the desired lengths of continuously formed sheet metal pipe and the helical lock seam pipe while the latter is being formed, and to accomplish this result rapidly and in a manner that will leave a minimum amount of dressing or finishing to be done, which where desirable, requires only a very small fraction of the time heretofore required.

A still further object of the invention is the provision of a portable pipe cut-off machine that is better balanced than heretofore, and more compact, and that is adapted for use in the field.

In explanation of the above, in cutting pipe in the field, the pipe usually comes in predetermined lengths, but much of it must be cut to suit certain conditions that are encountered.

The present machine may be readily transported to any desired place, and the pipe to be cut is positioned on the pipe support at the cutter and rotated by the person holding the pipe while so supported. The only point at which a burr or uneven edge may be formed is at the point where the cutter enters the pipe, which may be approximately a tenth or twentieth of the total circumference of the pipe, according to the diameter of the latter, and this small portion, if objectionable, is easily and quickly removed. However, the stability of the cut-off machine during cutting is important, and the present machine is designed to provide such desired stability in a small compact, portable structure.

In the drawings,

FIG. 1 is an end view of the cut-off machine, illustrated in association with a portion of helical lock seam pipe forming machine such as is shown in my copending application for United States Letters Patent Serial No. 157,350, filed December 6, 1961, the pipe being shown in cross section.

FIG. 2 is a side elevational view of the machine of FIG. 1, including a portion of helical lock seam pipe and part of the machine for making the latter; this view is taken substantially along line 2—2 of FIG. 1.

FIG. 3 is an enlarged, fragmentary cross sectional view taken along line 3—3 of FIG. 2, but with the pipe that is being cut being indicated schematically, and not in cross section, for purpose of clarity in the view.

FIG. 4 is a greatly enlarged, fragmentary cross sectional view of the cutter and shear plate, at the point where the pipe is cut.

FIG. 5 is a fragmentary, top plan view of the cutter and shear plate of FIG. 3.

In detail, the machine, as illustrated, comprises a substantially oblong base 1, that is adapted to be supported on the ground or floor in a horizontal position, and rigid with this base, adjacent to opposite ends thereof, and spaced between the longitudinally extending sides, are a pair of opposed upstanding bearings 2, one being adjacent to each of said ends.

A horizontal shaft 3 is rotatably supported at its ends in bearings 2, and the end portions of said shaft project oppositely outwardly of said pair of bearings. Collars 4 removably secured on said shaft at the adjacent sides of the bearings secure the shaft against longitudinal movement of the latter relative to the bearings.

A frame, generally designated 5, is above said base, which frame comprises a pair of generally vertically extending, horizontally spaced opposed end plates 7, 8 (FIG. 2) the lower ends of which are pivotally supported by shaft 3 in a position spaced above the base 1.

The "front" side of the machine will be the side adjacent to which the operator stands, and the "rear" side is the opposite side. Likewise, the words "forwardly" and "rearwardly" will be used with reference to said front and rear sides hence movement of the upper portion of the frame forwardly refers to a movement in which the front side is leading.

The frame 5, being spaced at shaft 3 above base 1 will be swingable about the axis of said shaft. However, the lower edges of the plates 7, 8 project rearwardly from the shaft 3 (FIG. 1) and these edges, indicated at 9, are preferably cut off at a slight angle relative to horizontal, when the plates 7, 8 are exactly vertical, so as to engage the upper horizontal surface of base 1 when the frame 5 is tilted slightly rearwardly so as to support the frame 5 in a rearwardly tilted position relative to horizontal.

At the opposite side of shaft 3, the end frame member or end plate 8 is provided with a forwardly extending projection 11 that is formed with a generally vertically extending threaded opening for an adjusting screw 10 that is adapted to be held by a lock nut 12 in adjusted position.

Upon swinging the upper end portion of the frame 5 forwardly, the lower end of the screw 10 will engage the floor to limit said forward movement, and it should be noted that this limit of movement is preferably such that the center of gravity of the frame and the structure carried thereby is at the forward side of shaft 3 so that the machine will remain in the forward position when so swung. Thus the frame will automatically stay in either the forward position or rearward position except when positively and intentionally moved therefrom, and the exact position of the frame relative to the base when in the forward position is adjustable.

A pair of parallel, horizontally extending, spaced, opposed tracks 13 (FIGS. 1, 2) having upper and lower edges respectively of inverted V, and V-shaped cross sectional contours, connect the upper end portions of the end plates 7, 8, said tracks being relatively wide, vertically, and being adjacent to the opposite side edges of the plates 7, 8.

A carriage, generally designated 14 is supported on these tracks, or rails 13. Said carriage is horizontally elongated in the same direction as the tracks 13 extend and includes an upper platform or table 15 (FIG. 1) having side plates 16 that are rigid with the table 15 and that extend downwardly therefrom in spaced opposed relation over the oppositely outwardly facing sides of the pair of tracks 13.

A vertically spaced pair of rollers 17, 18 is rotatably supported on oppositely extending stub shafts 19 rigid with the side plates 16, and these rollers have outer peripheries rotatable on and complementary to the upper and lower edges of tracks 13.

The horizontal length of the carriage 14 is substantially less than the distance between the end plates 7, 8, hence the carriage is adapted to have a reciprocable movement between said end plates. The tracks 13 themselves are preferably horizontal, so that the carriage will stay in whatever position to which it is moved on the tracks.

Projecting laterally from the forward side of the carriage 14 is a handle 20 that is rigid with the carriage. This handle 20 preferably projects slightly upwardly relative to the plane of the forward side plate 16 to which it is secured, and may be used to manually move the carriage 14 along tracks 13 or to swing the frame and carriage, as a unit, about shaft 3.

A link 22 extends slantingly downwardly and away from the forward edge of end frame plate 7, said link being pivotally connected at its upper end by a pivot 23 (FIG. 1) with a lug 21 that is rigid with and that projects forwardly from the plate 7.

The lower end of link 22 is connected by a pivot 24 with the arm 25 of a foot engageable treadle 26. The end of the arm 25 that is opposite to treadle 26 is pivotally connected at 27 with a lug 28 that projects upwardly from base 1, and that is rigid with said base. The pivot 24 is between the treadle 26 and pivot 27, and arm 25 extends generally horizontally from pivot 27. A downward pressure of the foot of an operator on the treadle 26 will cause the frame 5 and the carriage 14 to swing forwardly, and the position of the treadle 26 at the right hand end of the forward side of the machine, as seen in FIG. 2, makes it quite easy for an operator at said forward side and between the ends of the frame, to observe the operation of the cutter, as will later be explained more in detail.

Rigidly bolted to the table or platform 15 of the carriage 14, and over said platform, is a motor 29 between and rigid with vertical, spaced opposed end pieces 30. These end pieces may be in the form of plates that may constitute the ends of the motor housing, and said plates project at their upper ends past the motor (FIGS. 1, 2).

A pair of horizontally extending shafts 32, 33 are journalled at their ends for rotation in plates 30, or any suitable bearings may be carried by said plates for rotatably supporting said shafts. Also the drive shaft 34 of the motor extends through one of said plates 30 (FIG 1).

The shaft 33 is at a level above the shaft 32 and is the uppermost of the three shafts 32–34. A sprocket wheel 35 secured on the motor drive shaft 34 is connected by a chain 36 to sprocket wheel 37 on one end of shaft 32. These sprocket wheels 35, 37 are outwardly of the left hand end of the carriage 14, as seen in FIG. 2. At the right hand end of the carriage, a sprocket wheel 38 (FIG. 1) secured on the end of shaft 32 connects by a sprocket chain 39 with a sprocket wheel 40 secured on the end of shaft 33.

The shaft 33 projects outwardly of the adjacent end piece 30 of motor 29 and beyond the sprocket wheel 40, and a relatively thin, circular, plain milling cutter 42 is secured on the outer end of said shaft 33.

The term "plain milling cutter" is intended to refer to a cutter in which the outer edges of the teeth are parallel with the axis of rotation of the cutter, and the opposite lateral sides of the teeth are at right angles to the outer peripheral edges of the teeth so that the edges of the teeth that extend generally radially from the ends of the outer edges will cooperate with a shear plate, as will said outer edges, to perform clean shearing cuts, as will be explained.

Rigid with the carriage 14 is a generally vertically extending post 43, which post extends upwardly from the carriage along the forward edge of the motor end piece 30 that is adjacent to the cutter 42.

Rigidly bolted by bolts 44 onto the upper end of post 43 is a shear plate 45 (FIG. 5). This shear plate projects from the upper end of post 43 rearwardly toward cutter 42 and is formed with a rearwardly opening recess 46 in the edge that is adjacent to said cutter into which the teeth and a small part of the outer marginal portion of said cutter extend (FIGS. 3–5). The upper surface 47 of the portion of the shear plate adjoining the edges of opening 46 (FIG. 5) is preferably flat and in a plane that may be slightly tilted rearwardly and downwardly toward cutter 42 when the frame 5 is in its rearward position, and the shear plate is spaced above the level of the shaft 33 (FIG. 3). The clearance indicated in FIG. 5 between the edges of slot 46 and the saw is exaggerated, for clarity, since these edges must be in shearing relation to the sides and outer edges of the saw teeth in order to cleanly shear the metal without forming burrs.

This upper surface 47 of the portion of the shear plate in which the opening 46 is formed, constitutes a marginal portion along the edges of the opening or recess 46, and the remainder of the upper surface of the shear plate extends slantingly forwardly and downwardly away from the surface 47 when the latter is in working position. By "working position" is meant the pipe supporting position, and the frame 5 is in its forwardly swung position when it is to support the pipe for cutting. This is particularly important with respect to the surface 48 that extends over the post 43.

The forward end edge of opening 46 that extends across the outer edges of the teeth 49 of the cutter is parallel with and in shearing relation to said outer edges of said teeth, and the edges defining the opposite sides of said opening are in shearing relation to the side edges 49 (FIG. 4) of said teeth that extend generally radially inwardly from the ends of the outer edges of the teeth.

Where the machine is used in conjunction with a pipe forming machine, such for example as a machine for forming a helical lock seam pipe, the cut-off machine may be positioned adjacent to the portion 50 of such machine that includes the seam forming rollers (FIG. 2) and generally below the pipe 52 with the axis of the cutter 42 parallel with the axis of the pipe and in which position the opening or recess 46 will be directly below the lowermost side of the pipe and the pipe will be adapted to be supported on surface 47, when the frame is swung to its forward position. At the time of positioning the pipe cut-off machine, the cutter will be in a rear position 53 as indicated in dot-dash lines in FIG. 3.

In FIG. 2 the strip from which pipe 52 is formed is indicated in cross section at 51, and as viewed in FIG. 2, it will be moved in a direction away from the viewer, or from right to left as seen in FIG. 1, and is progressively formed into a helix by any suitable guide means 57 that leads the strip to seam forming rollers 58. These rollers form the seam 59 (FIG. 2) and which seam normally projects radially outwardly of the outer surface of the helical pipe a negligible distance, which, at most, is approximately one-sixteenth of an inch in the heavier gauge metal. The pipe itself varies in diameter from approximately four to thirty-six inches and upward. Smaller diameter pipe is made from lighter gauge sheet metal, hence the seams will project radially outwardly of the pipe less or approximately one-thirty-second of an inch.

To perform a cutting operation while the pipe is moving axially from the pipe forming machine, the carriage 14 will be moved to the ends of the tracks 13 that are closest to the pipe forming machine, as in FIG. 2.

When the pipe is to be cut, the operator may depress the foot treadle 26 (FIG. 1) thus swinging the cutter 42 into the lower side of the pipe. The latter pipe will be rotating in the direction of the arrow 54 (FIG. 3) and the pipe will also be moving axially thereof, or toward an observer looking toward FIG. 3 while the cutter will be rotating in the direction of arrow 55. The cutter and pipe, as seen in FIGS. 1 and 4, rotate in the same direction. While the pipe, as it is formed, is supported on the upper surface 47 of the shear plate 45, as seen in FIG. 3, when the carriage 14 (FIG. 1) is swung forwardly or clockwise about the pivot 3, it should be noted that the teeth 49 of the milling cutter will tend to draw the pipe tightly against said surface 47 during a cutting operation, or move the pipe in the direction of movement of the teeth. This movement of the cutter into the pipe is quickly accomplished and only a very small portion of the pipe will be cut before the shearing operation at the shear plate commences, and from that point on until the cut is completed, small pieces of the pipe will be cleanly cut or sheared off. The cutter will automatically follow the pipe due to pressure of the oncoming pipe against one side of the cutter, and as soon as the leading end of the pipe is severed, the carriage will be swung rearwardly to position 53 (FIG. 3) until another length of pipe is to be cut off.

The portion of the pipe cut through the cooperation of the shear plate and cutter is smooth and requires no dressing or finishing since the shear plate along the edges of recess 46 hold the pipe wall against deformation radially of the pipe during the cutting step, and the small fractional part that is cut solely by the cutter independently of the shear plate at the time the cutter enters the side of the pipe is easily and quickly dressed if necessary.

From the foregoing explanation, it will be seen that the incline of surface 48 relative to surface 47 enables the shearing plate at the shearing point to be quickly swung to the desired position (as seen in full line in FIG. 3) without any likelihood of interference of the leading portion of plate 45 with the pipe as the plate is moved from position 53 to the full line position of FIG. 3.

Where the machine is used in connection with a pipe forming machine, it is usually more or less a part of the pipe forming machine, and can be quite accurately positioned relative to the pipe forming machine. However, one of the wide uses of the present machine is in the field, where pre-formed lengths of pipe are to be cut.

In such instances the frame may be rigid with the base, or may be positioned in its forward position and the pipe then positioned in the position of the pipe 52 (FIG. 3). The operators carrying the pipe will, of course, manually rotate the pipe during cutting thereof.

The fact that practically all of the structure on carriage 14, which includes the motor, shafts 32–34, post 43, shear plate 45 and cutter 42 are all substantially within the outline of the upwardly projected confines of the carriage 14 is important in that it provides a very stable and compact pipe cut off machine whether used with a spiral or helical pipe forming machine or otherwise. FIG. 2 is illustrative of the adaptability of the cut-off machine to be positioned quite close to a spiral pipe forming machine, if so desired.

It is to be understood that the detailed description is not intended to be restrictive of the invention, and that modifications and changes thereof may be made within the scope of the following claims.

I claim:
1. A portable cut-off machine, comprising:
 (a) a base adapted to be supported on a floor or on the ground;
 (b) a frame above said base extending upwardly therefrom;
 (c) means supporting said frame on said base for back and forth movement of the upper portion of said frame generally horizontally relative to said base;
 (d) a motor carried by said frame in a position above the latter and for said movement with the upper portion of said frame;
 (e) means on said frame for so carrying said motor;
 (f) a horizontally extending cutter shaft rotatably supported on said motor above the latter for rotation about a horizontal axis that extends in a direction that is substantially at a right angle to the direction of said back and forth movement, and connected with said motor for rotation thereby;
 (g) a rotary, relatively thin, circular, plain milling cutter secured on one end of said shaft for rotation therewith;
 (h) a generally horizontally disposed shear plate secured on said frame rigid relative to said cutter and formed with an opening, the edges of which opening are in shearing relation to the teeth of said cutter along the radially outer and opposite lateral edges thereof;
 (i) said shear plate projecting laterally from said cutter for supporting thereon the lower side of a pipe to be cut by said teeth.

2. In a construction as defined in claim 1;
 (j) said motor, shear plate, cutter shaft and cutter being substantially disposed within the outline of the upwardly projected confines of said base and frame.

3. A portable pipe cut-off machine comprising;
 (a) a base adapted to be supported on a floor or on the ground;
 (b) a frame above said base extending upwardly therefrom;
 (c) pivot means pivotally supporting the lower end of said frame on said base for swinging the upper end of said frame about a horizontally extending axis;
 (d) means connected with said frame for so swinging the latter;
 (e) tracks on said frame extending substantially parallel with said axis;
 (f) a carriage supported on said tracks for movement thereon longitudinally thereof;
 (g) a motor rigid on said carriage for movement with the latter;
 (h) a cutter shaft parallel with said axis, positioned over said motor in a fixed position relative to said motor, and rotatably supported on said motor for rotation about the axis of said shaft and connected with said motor for rotation thereby;
 (i) a rotary relatively thin, circular, plain milling cutter secured on one end of said shaft for rotation with the latter;
 (j) a shear plate secured on said carriage rigid relative to said cutter and movable with said carriage and swingable with said frame, said shear plate having an opening into which the teeth of said cutter at a lateral side of the latter extend with the edges of said opening in shearing relation to the peripheral outer edges of said teeth and their opposite lateral sides;
 (k) said motor, shear plate, shaft and cutter being positioned substantially within the upwardly projected outline of said carriage and,
 (l) said shear plate being adapted to support the lower side of a pipe thereon in a position extending transversely of the plane of said cutter.

4. In a pipe cut-off machine that includes a frame and a substantially horizontally disposed motor driven cutter shaft supported thereon for rotation about its horizontal axis;
 (a) a plain, circular, relatively thin milling cutter secured on said shaft;
 (b) a generally horizontally disposed shear plate;
 (c) said shear plate being formed with an opening therein having its edges in shearing relation to the outer and opposite lateral edges of the teeth of said cutter and said shear plate having an upwardly facing planar surface around said opening and extending substantially horizontally away from the edges of said opening;
 (d) means supporting said shear plate at a level above the axis of said shaft and rigid relative to said cutter with said edges of said teeth in said shearing relation to the edges of said opening whereby said plate will be adapted to support a length of pipe thereon with the lower side of said pipe at said opening for rotation of said pipe on said shear plate and cutting by said cutter and plate.

5. In a construction as defined in claim 4,
(e) said shear plate further including substantially flat generally upwardly facing surfaces inclined downwardly relative to said first mentioned surface to facilitate the positioning of said cutter and the lower side of said pipe in cutting relation to each other in which said lower side of said pipe is on said first mentioned surface with said pipe horizontal and substantially parallel with said axis of said cutter shaft.

6. A pipe cut-off machine comprising:
(a) a cutter supporting carriage;
(b) a vertically disposed, relatively thin, plain, circular milling cutter having an outer marginal portion formed with generally radially outwardly projecting cutting teeth having flat, parallel, lateral surfaces facing axially of said cutter and the outer ends of said teeth being formed with cutting edges extending transversely of said blade from one of said flat surfaces to the other;
(c) cutter supporting means rigid on said carriage supporting said cutter in a fixed position on said carriage projecting upwardly above the latter for rotation of said cutter about the axis of said cutter, and cutter rotating means connected with said cutter for rotating the latter in one direction about its axis for downward movement of said teeth at one side of said axis for cutting;
(d) a generally horizontally disposed shear plate having an upper surface and a horizontally extending recess closed at one end thereof and opening outwardly of said plate at its opposite end and having parallel spaced, opposed vertically disposed sides and a vertically disposed end surface at said one end, said recess being adapted to receive said teeth therein through the open end thereof and the distance between said sides, relative to the thickness of said teeth axially thereof, being such that the edges of said recess along said upper surface will be in close shearing relation to the edges of said teeth along their said lateral surfaces when said shear plate is in a position at said one side of said axis with said teeth in said recess;
(e) plate securing means securing said shear plate rigid on said cutter supporting carriage relative to said cutter in said last mentioned position;
(f) a horizontally elongated, generally vertically disposed, carriage supporting frame;
(g) means on said frame supporting said cutter supporting carriage thereon in a position above said frame and for movement of the latter horizontally of said frame in a direction parallel with the axis of rotation of said cuter whereby said cutter and said shear plate will be moved as a unit with said carriage upon said movement of the latter;
(h) said shear plate being adapted to support thereon a horizontally extending sheet metal pipe with its longitudinal axis parallel with the axis of said cutter for relative bodily movement between said cutter and pipe into a pipe severing position in which the lower side of said pipe is against said shear plate and in which position said teeth are adapted to cooperate with said shear plate to cut away pieces from said lower side only and to sever a section of said pipe from the remainder thereof upon said rotation of said cutter and upon one revolution of said pipe about its axis in the same direction as the direction of rotation of said cutter when said cutter and pipe are in said pipe severing position.

7. In a pipe cut-off machine as defined in claim 6:
(i) a base of relatively low height relative to the height of said frame adapted to be supported on the ground or on a floor;
(j) pivot means stationary relative to said base swingably supporting said frame and said carriage on said base for swinging said frame and carriage as a unit about a horizontal axis adjacent to said base extending longitudinally of said frame between a rearwardly inclined position of said frame and carriage in which said carriage is substantially offset to one side of said last mentioned axis, to an upright position in which said shear plate is substantially directly over said last mentioned axis and said cutter is in said pipe severing position;
(k) means respectively on said frame and base engageable with each other when said frame and carriage are in said rearwardly inclined position and said upright position for restricting said swinging movement of said frame and carriage past said two positions.

8. The method of severing a cylindrical sheet metal pipe that comprises the steps of:
(a) supporting a length of said pipe in a horizontally extending position at a predetermined level above the ground;
(b) rotating said pipe at said level about its longitudinal axis through at least one complete revolution of said pipe and at the same time;
(c) cutting out contiguous, discrete pieces of said pipe at its lowermost side only along a pair of horizontally spaced parallel lines extending circumferentially of said pipe and that are in parallel planes perpendicular to said axis; and
(d) holding the portions of said pipe at the opposite outer sides of said pair of lines, and adjoining the latter against deformation radially of said pipe whereby said pipe will be severed along said lines and said last mentioned portions will be substantially free from burrs.

References Cited in the file of this patent
UNITED STATES PATENTS

| | | |
|---|---|---|
| 1,413,191 | Roland | Apr. 18, 1922 |
| 1,698,250 | Adams | Jan. 8, 1929 |
| 2,002,346 | Goodwillie | May 21, 1935 |
| 2,350,975 | Rodder | June 6, 1944 |
| 2,682,307 | Overman | June 29, 1954 |
| 2,711,762 | Gaskell | June 28, 1955 |